US009996987B2

(12) United States Patent
Rai et al.

(10) Patent No.: US 9,996,987 B2
(45) Date of Patent: *Jun. 12, 2018

(54) WIRELESS INCENTIVE SYSTEM FOR VEHICLE USERS

(71) Applicant: Toyota InfoTechnology Center USA, Inc., Mountain View, CA (US)

(72) Inventors: Vinuth Rai, Mountain View, CA (US); Dustin Harber, Mountain View, CA (US); Divya Sai Toopran, Mountain View, CA (US); Matthew Kresse, Mountain View, CA (US); Ugur Oezdemir, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/253,869

(22) Filed: Sep. 1, 2016

(65) Prior Publication Data
US 2016/0371894 A1 Dec. 22, 2016

Related U.S. Application Data

(63) Continuation of application No. 14/578,197, filed on Dec. 19, 2014, now Pat. No. 9,477,970.

(51) Int. Cl.
| | |
|---|---|
| *G07C 5/00* | (2006.01) |
| *G06Q 30/02* | (2012.01) |
| *G01C 21/34* | (2006.01) |
| *G01C 21/36* | (2006.01) |
| *G06K 19/06* | (2006.01) |
| *H04W 12/06* | (2009.01) |
| *G05D 1/00* | (2006.01) |
| *G06Q 50/00* | (2012.01) |

(52) U.S. Cl.
CPC ......... *G07C 5/006* (2013.01); *G01C 21/3484* (2013.01); *G01C 21/3632* (2013.01); *G01C 21/3697* (2013.01); *G06K 19/06112* (2013.01); *G06Q 30/0265* (2013.01); *G07C 5/008* (2013.01); *H04W 12/06* (2013.01); *G06Q 50/01* (2013.01)

(58) Field of Classification Search
CPC .... G07C 5/006; G07C 5/008; G01C 21/3484; G01C 21/3632; G01C 21/3697; G06K 19/06112; G06Q 30/0265; G06Q 50/01; H04W 12/06
USPC ........ 701/1, 31.4, 117, 118, 532; 340/425.5, 340/905
See application file for complete search history.

(56) References Cited

U.S. PATENT DOCUMENTS 9,444,970 B2 * 9/2016 Jones .................... G06T 3/0018

FOREIGN PATENT DOCUMENTS

JP 2010186062 A 8/2010

\* cited by examiner

*Primary Examiner* — Gertrude Arthur Jeanglaude
(74) *Attorney, Agent, or Firm* — Burbage Law, P.C.; Jon-Michael Burbage; Elizabeth Ruzich

(57) ABSTRACT

The disclosure includes a system and method for determining, based on vehicle sensor data associated with the vehicle, a current vehicle condition that is detrimental to operation of the vehicle, transmitting, by a mobile computing device programmed to perform the transmitting, a description of the current vehicle condition to a condition message provider, and receiving a condition message that includes offer data and mitigating plan data describing one or more steps configured to alter the current vehicle condition.

20 Claims, 7 Drawing Sheets

WIRELESS INCENTIVE SYSTEM FOR VEHICLE USERS

PRIORITY CLAIM

The application is a continuation of U.S. patent application Ser. No. 14/578,197 entitled "Wireless Incentive System for Vehicle Users" and filed on Dec. 19, 2014, the entirety of which is hereby incorporated by reference.

BACKGROUND

The specification relates to generating wireless incentives for vehicle users by displaying a mitigating action plan data and offer data.

Vehicles are frequently in need of a service to continue operating. For example, vehicles with combustion systems may run out of gas. In addition, vehicles may need to be serviced to correct a mechanical failure. Due to the abundance of vehicle service providers, however, individual vehicle service providers may have difficulty attracting drivers to their particular store. Vehicle service providers may post advertisements for sale items, but the advertisements may be difficult to see from the road, especially when the vehicles are driving by at a fast speed.

SUMMARY

According to one innovative aspect of the subject matter described in this disclosure, a system and method include determining, by a mobile computing device programmed to perform the determining, a journey for a vehicle based on historical journey data including a most frequently travelled route for a current location of the vehicle at a current time; receiving, from the vehicle, a current vehicle condition that is detrimental to operation of the vehicle; transmitting a description of the current vehicle condition to a condition message provider; receiving, from the condition message provider, a condition message that includes offer data and mitigating action plan data describing one or more steps configured to alter the current vehicle condition, the mitigating action plan data including an offer fulfillment location that is part of the journey and the offer data including an offer for a good or service associated with the offer fulfillment location; displaying the offer data and the mitigating action plan data on a display of the mobile computing device; and providing turn-by-turn navigation instructions during the journey from the current location to the offer fulfillment location.

In general, another innovative aspect of the subject matter described in this disclosure may be embodied in systems that include: a vehicle comprising a vehicle status application stored on an onboard computer of the vehicle, the vehicle status application including instructions that, when executed, cause the vehicle status application to receive vehicle sensor data associated with the vehicle, determine, based on the vehicle sensor data, a current vehicle condition that is detrimental to operation of the vehicle, and detect a presence of a mobile computing device that is paired with the vehicle; and the mobile computing device comprising a journey application including instructions that, when executed, cause the journey application to receive a description of the current vehicle condition from the vehicle application, determine a journey based on historical journey data, transmit the description of the current vehicle condition and the journey to a condition message provider, and receive a condition message from the condition message provider that includes offer data and mitigating action plan data comprising an offer fulfillment location that is included in a route of the journey and that mitigates the current vehicle condition.

In general, another innovative aspect of the subject matter described in this disclosure may be embodied in methods that include: determining, based on vehicle sensor data associated with the vehicle, a current vehicle condition that is detrimental to operation of the vehicle, transmitting, by a mobile computing device programmed to perform the transmitting, a description of the current vehicle condition to a condition message provider, and receiving a condition message that includes offer data and mitigating plan data describing one or more steps configured to alter the current vehicle condition.

These and other implementations may each optionally include one or more of the following operations and features. For instance, the operations further include: determining a journey for the vehicle based on historical journey data, wherein the mitigating action plan data includes an offer fulfillment location included in a route of the journey and the offer data includes an offer for a product or service at the offer fulfillment location; determining turn-by-turn navigation instructions based on the mitigating action plan data and user input indicating that the user accepts the one or more steps of the mitigating action plan data and providing the turn-by-turn navigation instructions during the journey from a current location to the offer fulfillment location; displaying the mitigating action plan data and the offer data on a display of the mobile device, responsive to the vehicle arriving at the offer fulfillment location, receiving graphical data that displays a barcode, and displaying the barcode on the display of the mobile device; detecting a presence of the vehicle that is paired with the mobile device and receiving the vehicle sensor data from the vehicle, where determining the current vehicle condition is performed by the mobile computing device; responsive to detecting the presence of the vehicle that is paired with the mobile computing device, determining that a journey begins; providing authentication data to the vehicle to authenticate that the mobile computing device is authorized to receive the current vehicle condition from the vehicle; sending fulfillment transaction data to the condition message provider; registering a user, including importing information from at least one of a social network account associated with the user and an online calendar account associated with the user; and determining a journey for the vehicle based on historical journey data and the at least one of the social network account associated with the user and the online calendar account associated with the user.

For instance, the features include: determining the journey for the vehicle based on the historical journey data being further based on a most frequently travelled route for a current location at a current time; where the vehicle detects a presence of the mobile computing device that is paired with the vehicle and where determining the current vehicle condition is performed by the vehicle; where the vehicle detects the presence of the mobile computing device using direct point-to-point wireless communication between the vehicle and the mobile computing device associated with the user.

The disclosure is particularly advantageous in a number of respects. For example, advertisers can more efficiently target users. In addition, users get helpful reminders about current vehicle conditions and free or discounted goods or services. Lastly, vehicle manufacturers that manufacture vehicles including the journey application can distinguish themselves from other available vehicles.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System Overview

Figure 1:
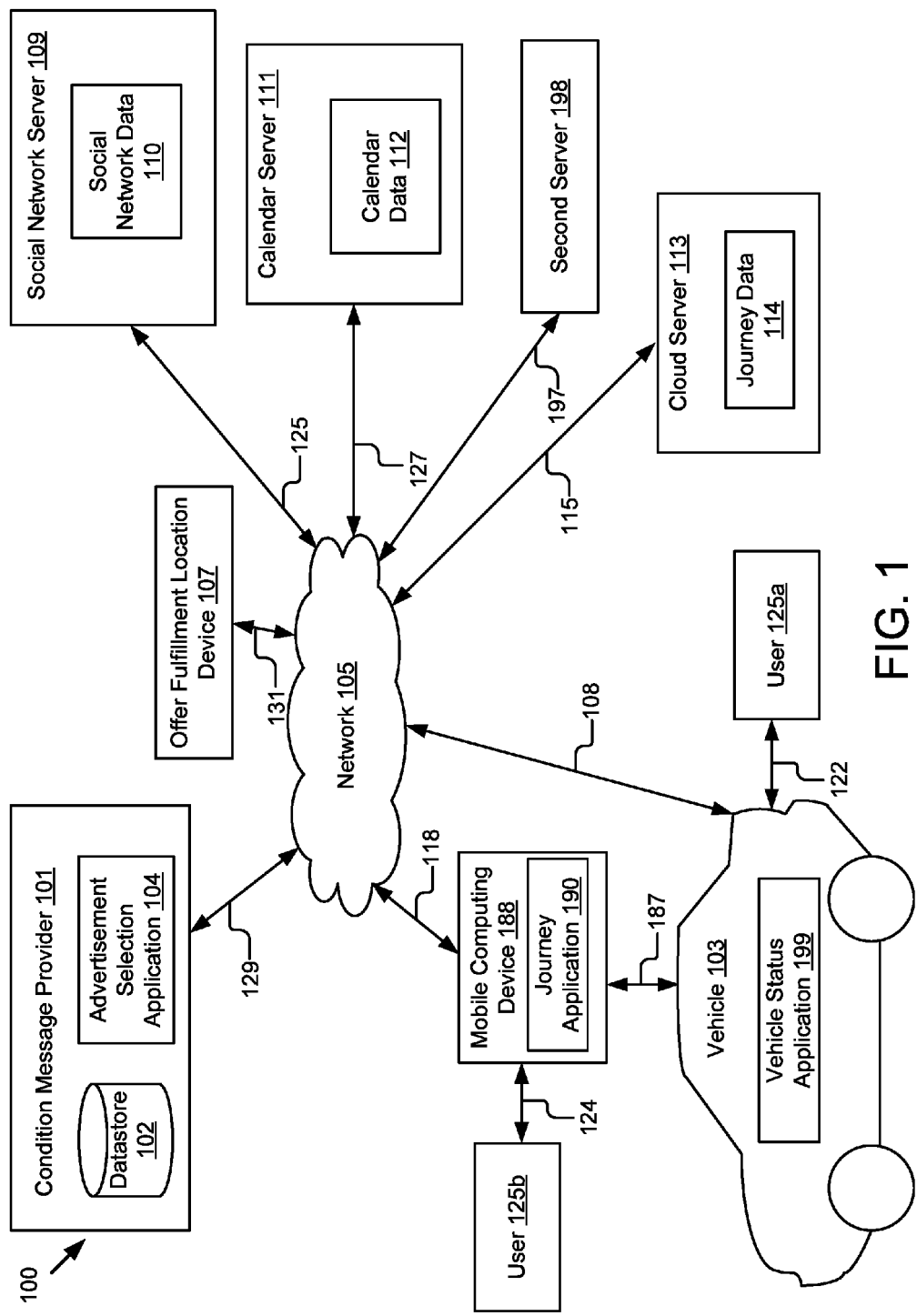
FIG. 1 is a block diagram illustrating an example system for generating wireless incentives for vehicle users.

FIG. 1 is a block diagram illustrating an example system 100 for generating wireless incentives for vehicle users. The system 100 includes a vehicle 103, a mobile computing device 188, a social network server 109, a calendar server 111, a second server 198, a cloud server 113, a condition message provider 101, and an offer fulfillment location device 107. The vehicle 103 and the mobile computing device 188 can be accessed by users 125a and 125b (also referred to herein individually and collectively as "user 125"), via signal lines 122 and 124, respectively. In the illustrated example, these entities of the system 100 may be communicatively coupled via a network 105.

The vehicle 103 and the mobile computing device 188 in FIG. 1 can be used by way of example. While FIG. 1 illustrates a single vehicle 103 and a single mobile computing device 188, the disclosure applies to a system architecture having one or more vehicles 103 and one or more mobile computing devices 188. Furthermore, although FIG. 1 illustrates one network 105 coupled to the vehicle 103, the mobile computing device 188, the cloud server 113, the condition message provider 101, the social network server 109, the calendar server 111, the second server 198, and the offer fulfillment location device 107, in practice one or more networks 105 can be connected. While FIG. 1 includes one cloud server 113, condition message provider 101, social network server 109, calendar server 111, second server 198, and offer fulfillment location device 107, the system 100 could include one or more cloud servers 113, condition message providers 101, social network servers 109, calendar servers 111, second servers 198, and offer fulfillment location devices 107.

The network 105 can include a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may include a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, etc. In some implementations, the network 105 may include a global positioning system (GPS) satellite for providing GPS navigation to the vehicle 103 or the mobile computing device 188. The network 105 may include a mobile data network for example, 3G, 4G, long-term evolution (LTE), Voice-over-LTE ("VoLTE"), or other mobile data network or combination of mobile data networks.

The vehicle 103 can be a mobile client device with a battery system. For example, the vehicle 103 can be an automobile, a bus, a motorcycle, or another mobile system including non-transitory computer electronics and a battery system. In some implementations, the vehicle 103 may include a computing device that includes a memory and a processor. In the illustrated example, the vehicle 103 is communicatively coupled to the network 105 via signal line 108.

The vehicle 103 includes a vehicle status application 199. The vehicle status application 199 may include codes and routines for receiving vehicle sensor data associated with the vehicle and determining a current vehicle condition that is detrimental to operation of the vehicle based on the vehicle sensor data. For example, the vehicle status application 199 may receive vehicle sensor data about the amount of gas remaining in the vehicle 103. The status application 199 may determine that the vehicle 103 is going to run out of gas in less than five miles based on the vehicle sensor data.

The mobile computing device 188 may be a portable computing device that includes a memory and a processor, for example, a removable in-dash device, a laptop computer, a tablet computer, a mobile telephone, a personal digital assistant (PDA), a mobile e-mail device, a smartwatch, a portable game player, a portable music player, or other portable electronic device capable of accessing the network 105. The mobile computing device 188 may access the network 105 via signal line 118. In some implementations, the mobile computing device 188 may include a processor-based computing device.

The mobile computing device 188 includes a journey application 190. The journey application 190 includes code and routines that may be configured to receive a current vehicle condition from the vehicle status application 199 via signal line 187. For example, the journey application 190 communicates with the vehicle status application 199 using Bluetooth®. Alternatively, the journey application 190 may receive vehicle sensor data from the vehicle status application 199 and determine the current vehicle condition. The journey application 190 may determine a journey for the vehicle 103. For example, the journey application 190 may determine that the vehicle 103 is travelling to work based on historical journey data that includes a most frequently travelled route for a current location of the vehicle at a current time.

The journey application 190 transmits a description of the current vehicle condition to a condition message provider 101. The journey application 190 may also transmit journey data to the condition message provider 101. The journey application 190 receives a condition message from the condition message provider 101 that includes offer data and mitigating action plan data describing one or more steps configured to alter the current vehicle condition. The offer data may include an offer for a free soda at the gas station. The mitigating action plan data may include, for example, a location of the gas station.

The mobile computing device 188 may display the mitigating action plan data and the offer data on a display of the mobile computing device 188. In some implementations, after the mobile computing device 188 is near an offer fulfillment location, the mobile computing device 188 displays a coupon. For example, the coupon may include a barcode.

In some implementations, user 125a and user 125b can be the same user 125 interacting with both the vehicle 103 and the mobile computing device 188. For example, the user 125 can be a driver sitting in the vehicle 103 (e.g., a vehicle) and operating the mobile computing device 188 (e.g., a smartphone). In some other implementations, the user 125a and the user 125b may be different users 125 that interact with the vehicle 103 and the mobile computing device 188, respectively. For example, user 125a could be a driver that drives the vehicle 103 and user 125b could be a passenger that interacts with the mobile computing device 188. As a result, the user 125b that redeems the coupon at the offer fulfillment location may be different from the user 125a that drives the vehicle 103.

In some implementations, the cloud server 113 includes journey data 114 that the journey application 190 may use to determine a journey for the vehicle 103. The cloud server 113 may serve as cloud storage for the journey application 190 and may store all historical journeys taken by the vehicle 103. Alternatively, the cloud server 113 may include journeys taken by multiple vehicles 103. For example, the journey data 114 may include journeys taken by any vehicle 103 that are used to determine frequently travelled routes. The cloud server 113 may communicate with the network 105 via signal line 115.

The social network server 109 can include a hardware server that includes a processor, a memory, and network communication capabilities. The social network server 109 may include a social network application. The social network application may generate a social network and the social network data 110. For example, the social network may include Facebook™, Google+™, LinkedIn™, Tinder™, Mixi™, Tencent QQ™, or Renren™.

The social network server 109 may transmit the social network data 110 to the journey application 190. The journey application 190 may use the social network data 110 to determine an endpoint for the journey. For example, the social network data 110 may include a post from a user 125 stating that the user is travelling to Mountain View, Calif. The journey application 190 determines that the journey includes travelling to Mountain View, Calif. The social network server 109 may communicate with the network 105 via signal line 125.

The calendar server 111 can include a hardware server that includes a processor, a memory, and network communication capabilities. The calendar server 111 may include a calendar application. The calendar application may generate an electronic calendar and the calendar data 112. For example, the calendar application may include Google™ Calendar, Microsoft Outlook™, or Apple™ Calendar.

The calendar server 111 may transmit the calendar data 112 to the journey application 190. The journey application 190 may use the calendar data 112 to determine an endpoint for the journey. For example, the calendar data 112 may include a business meeting at Company X in Menlo Park, Calif. The journey application 190 determines that the journey includes travelling to Company X in Menlo Park, Calif. The calendar server 111 may communicate with the network 105 via signal line 127.

The second server 198 can include a hardware server that provides data to the journey application 190, the vehicle 103, or the vehicle status application 199. The second server 198 can include an infotainment server for providing infotainment, a music server for providing streaming music services, a traffic server for providing traffic data, a map server for providing map data, a weather server for providing weather data, a power service server for providing power usage service (e.g., billing service), or a health server for providing health information. For example, the map server can provide map data to the journey application 190 for determining a route of the journey. The second server 198 may communicate with the network 105 via signal line 197.

The second server 198 may host and/or generate websites that provide one or more of the following network services: navigation instructions; streaming audio or video (for example, Pandora™, Spotify™, iTunes™, Google Play™, YouTube™, Netflix™, Hulu Plus™, Crackle™, Amazon™ Instant Video, Prime Instant Video, Digital Music Store, Prime Music App Store, etc.); microblogging (for example, Twitter™, Tumblr™, etc.); online chatting (for example, Google Chat™, Snapchat™, WhatsApp™, etc.); online content sharing (for example, Instagram™, Pinterest™, etc.); e-mail (for example, Gmail™, Outlook™, Yahoo! Mail™, etc.); file sharing (for example, Dropbox™, Google Drive™, MS OneDrive™, Evernote™, etc.); and health data sharing (for example, Fitbit™, Jawbone™, Nike+ Fuelband, etc.). In some implementations, a user may consume one or more of these network's services via an infotainment system of the vehicle.

The second server 198 may transmit data to the journey application 190. The journey application 190 may use the data to determine an endpoint for the journey. For example, the data may include an e-mail to a friend that discusses meeting in San Jose at a coffee house for coffee. The journey application 190 may determine the location of the coffee house as the endpoint of the journey.

The condition message provider 101 includes a datastore 102 and an advertisement selection application 104. The condition message provider 101 may communicate with the network 105 via signal line 129.

The datastore 102 may include a list of offer fulfillment locations, offer data that includes offers for goods or services that the offer fulfillment locations provide, coupons, user identifiers (IDs), vehicle IDs, mobile IDs, access information for the users' social network applications and calendar applications, vehicle conditions, a current time and historical journey data for the users 125, and a purchase history associated with each user 125.

The advertisement selection application 104 receives a current vehicle condition from the journey application 190. The advertisement selection application 104 may also receive journey data 114 from the journey application 190 or the cloud server 113. For example, the advertisement selection application 104 receives information about how the vehicle 103 is low on gas and a journey that the vehicle 103 is taking.

The advertisement selection application 104 determines the locations of offer fulfillment locations that are on a route of the journey. In some implementations the offer fulfillment locations are visible from the route of the journey. In other implementations, the offer fulfillment locations may be within a certain distance from the route, for example, within 200 feet. Where multiple offer fulfillment locations are located along a route of the journey, the advertisement selection application 104 may conduct an auction where the offer fulfillment locations bid for the right to send an offer to the journey application 190. The advertisement selection application 104 may determine the winner of the auction based on the highest price paid for the right to send the offer to the journey application 190 or the best offer for the user 125 (e.g., an offer with the highest monetary value).

In some implementations, the advertisement selection application 104 may receive social network data 110 from the social network server 109 that can be used to determine an offer for the user 125. For example, the social network data 110 may include user preferences about favorite snack foods for the user 125. The advertisement selection application 104 may use the user preference to create an offer for a free candy bar.

The advertisement selection application 104 may receive calendar data 112 from the calendar server 111 that can be used to determine an offer for the user 125. For example, if the calendar data 112 includes a dentist appointment, the user 125 may be more interested in receiving a free pack of xylitol gum than a free soda because the xylitol gum is better for dental health. The advertisement selection application 104 may charge more for advertisements that are based on social network data 110 and the calendar data 112 because the information is more personalized and more likely to result in the user visiting the offer fulfillment location.

The advertisement selection application 104 may transmit a condition message to the mobile computing device 188 that includes offer data and mitigating action plan data describing one or more steps configured to alter the current vehicle condition. The mobile computing device 188 may display the offer data on a display of the mobile device. If the vehicle 103 proceeds to the offer fulfillment location, once the vehicle 103 arrives at the offer fulfillment location, the advertisement selection application 104 may transmit graphical data for displaying a coupon that includes a barcode on the display of the mobile computing device 188.

In some implementations, the advertisement selection application 104 includes additional information about the offer fulfillment location. For example, where the current vehicle condition is a vehicle 103 that is low on gas, the advertisement selection application 104 may transmit a condition message that includes a location of a gas station and the price of gas at the gas station. In another example, the advertisement selection application 104 may transmit a condition message that includes a wait time for receiving service at the offer fulfillment location.

In some implementations, the advertisement selection application 104 can be implemented using hardware including a field-programmable gate array ("FPGA") or an application-specific integrated circuit ("ASIC"). In some other implementations, the vehicle status application 199 can be implemented using a combination of hardware and software. The vehicle status application 199 may be stored in a combination of the devices and servers, or in one of the devices or servers.

The offer fulfillment location device 107 can include a processor, a memory, and network communication capabilities. For example, the offer fulfillment location device 107 may include a computer attached to a scanner for scanning a barcode displayed on the mobile computing device 188. The offer fulfillment location device 107 may transmit transaction data to the condition message provider 101, which uses the transaction data to improve the offers provided to the user 125*b*. The offer fulfillment location device 107 may communicate with the network 105 via signal line 131.

Example Vehicle Status Application

Figure 2:
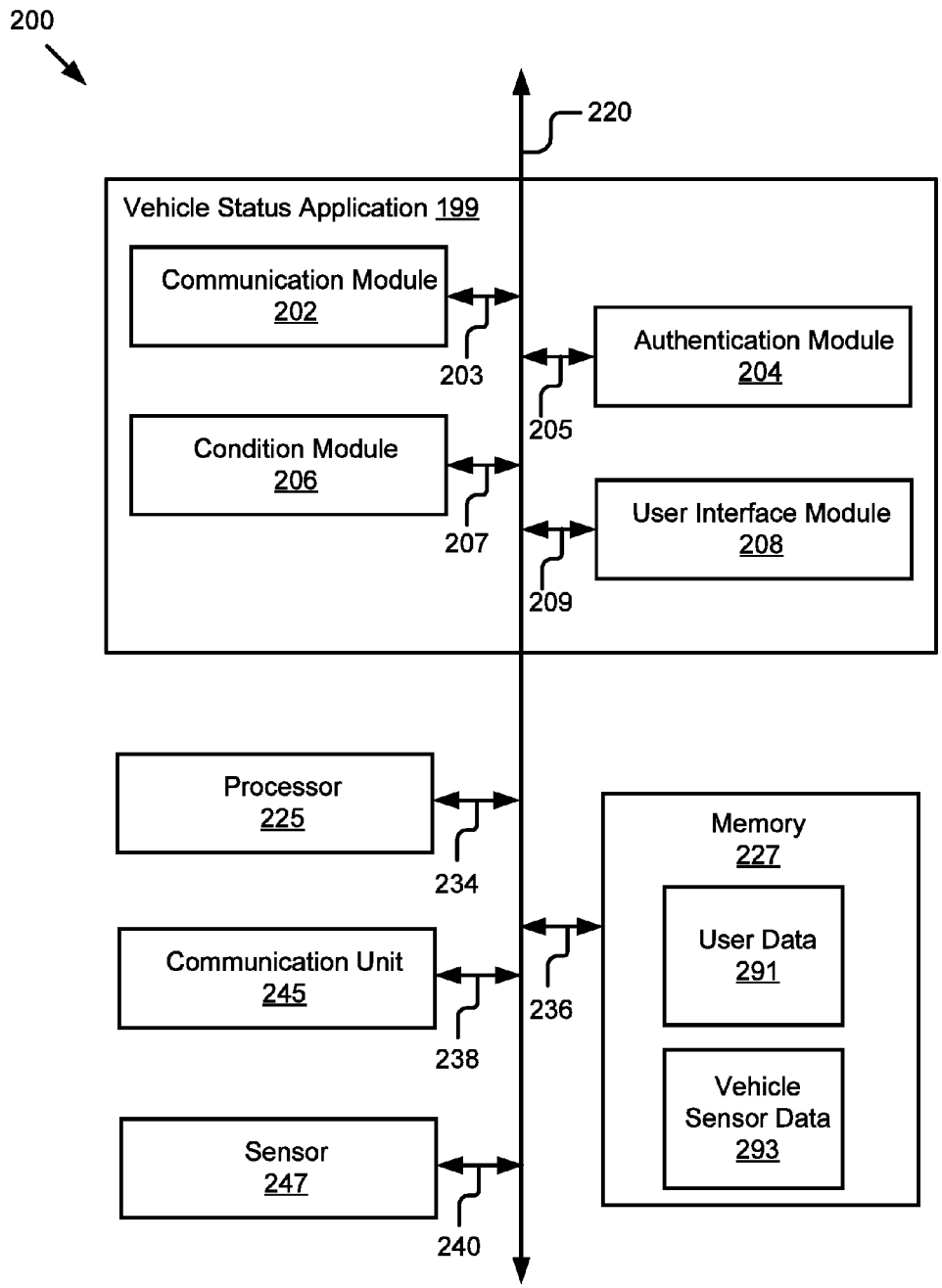
FIG. 2 is a block diagram illustrating an example vehicle device.

FIG. 2 is a block diagram illustrating an example vehicle device 200. The vehicle device 200 is part of the vehicle 103 and includes the vehicle status application 199, a processor 225, a memory 227, a communication unit 245, and a sensor 247. In some implementations, the vehicle device 200 may include a special-purpose computing device configured to provide some or all of the functionality described below with reference to FIG. 2. The components of the vehicle device 200 are communicatively coupled by a bus 220.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, a graphic processor unit (GPU) architecture or an architecture implementing a combination of instruction sets. Although FIG. 2 includes a single processor 225, multiple processors 225 may be included. Other processors, operating systems, sensors, displays, and physical configurations may be possible. In some implementations, the processor 225 is programmed to perform one or more blocks of the methods 500, 600 described below with reference to FIGS. 5 and 6. The processor 225 is coupled to the bus 220 for communication with the other components via signal line 234.

The memory 227 stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 236.

As illustrated in FIG. 2, the memory 227 stores user data 291 and vehicle sensor data 293. The processor 225 may be communicatively coupled to the memory 227 to access or execute the user data 291 or the vehicle sensor data 293.

The user data 291 includes information about the users, for example, a unique identifier (ID) for the user, a mobile computing device ID, and authentication data that can be used for authentication. The vehicle status application 199 may receive a mobile computing device ID and compare it to the user data 291 to authenticate the mobile computing device 188 and confirm that the mobile computing device 188 can have access to the vehicle sensor data 293.

The vehicle sensor data 293 includes information about sensor readings. For example, the vehicle sensor data 293 includes sensor readings recorded at a particular time period. The vehicle sensor data 293 may include a gas level, an oil level, a timer that measures how much time has elapsed since different services were performed on the car, such as an oil change, checking the timing belt, etc. The vehicle status application 199 may use the vehicle sensor data 293 to determine a current vehicle condition. In some implementations, the vehicle status application 199 transmits the vehicle sensor data 293 to the journey application 190 to determine a current vehicle condition.

The communication unit 245 can include hardware that transmits and receives data to and from the vehicle 103. The communication unit 245 is coupled to the bus 220 via signal line 238. In some implementations, the communication unit 245 includes a port for direct physical connection to the network 105 or to another communication channel. For example, the communication unit 245 includes a USB, SD, CAT-5, or similar port for wired communication with the vehicle 103. In some implementations, the communication unit 245 includes a wireless transceiver for exchanging data with the vehicle 103 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

In some implementations, the communication unit 245 detects a presence of the mobile computing device 188. For example, the communication unit 245 detects the presence of the mobile computing device 188 via direct point-to-point wireless communication between the vehicle 103 and the mobile computing device 188 associated with the user. The wireless communication may include Bluetooth®, Bluetooth® low energy (LE), near-field communication (NFC), etc. The communication unit 245 may include an antenna for detecting the point-to-point wireless communications. In some implementations, the vehicle 103 may include additional hardware for the wireless communication, for example, a dongle with a direct current (DC) battery so that the battery of the vehicle 103 is not drained during wireless communication.

The sensor 247 can include a device that provides vehicle sensor data 293 about sensor readings associated with the vehicle. The sensor 247 may be communicatively coupled to an onboard computer of a vehicle. The sensor 247 may include a gas gauge, an infrared detector, a motion detector, a thermostat, etc. For example, the vehicle 103 may include a sensor 247 for measuring one or more of a current time, a location (e.g., a latitude, longitude, and altitude of a location), an acceleration of a vehicle, a velocity of a vehicle, a fuel tank level of a vehicle, a battery level of a vehicle, etc. Alternatively or additionally, the sensor 247 can include a component or module of another system or device (e.g., radio, infotainment system, thermostat) that reports a status of the system or device to the vehicle device 200. In some implementations, the sensor 247 includes hardware for performing location detection, for example, a global positioning system (GPS), location detection through triangulation via a wireless network, etc. The sensor 247 provides information about at least one of a temperature inside the vehicle, a temperature outside the vehicle, a position of the seats, a radio station, an audio program, a window level, a level of illumination of car lights, a speed of windshield wipers, and other parameters or settings associated with the vehicle and/or any system, subsystem, or device included in or communicatively coupled to the vehicle. The sensor 247 is coupled to the bus 220 via signal line 240.

In some implementations, the vehicle status application 199 includes a communication module 202, an authentication module 204, a condition module 206, and a user interface module 208.

The communication module 202 can include code and routines for handling communications between the vehicle status application 199 and other components of the vehicle device 200. In some implementations, the communication module 202 can include a set of instructions executable by the processor 225 to provide the functionality described below for handling communications between the vehicle status application 199 and other components of the vehicle device 200. In some implementations, the communication module 202 can be stored in the memory 227 of the vehicle device 200 and can be accessible and executable by the processor 225.

The communication module 202 sends and receives data, via the communication unit 245, to and from one or more of the vehicle 103, the mobile computing device 188, the cloud server 113, the condition message provider 101, the second server 198, the calendar server 111, and the social network server 109. For example, the communication module 202 transmits a description of a current vehicle condition to the condition message provider 101. In another example, the communication module 202 receives authentication data from the mobile computing device 188 authenticating the mobile computing device 188. The communication module 202 is coupled to the bus 220 via signal line 203.

In some implementations, the communication module 202 receives data from components of the vehicle status application 199 and stores the data in the memory 227. For example, the communication module 202 receives data from the sensor 247, and stores it as vehicle sensor data 293 in the memory 227. In some implementations, the communication module 202 may handle communications between components of the vehicle status application 199. For example, the communication module 202 receives user data 291 from the authentication module 204 and transmits the user data 291 to the user interface module 208.

The authentication module 204 can include code and routines for authenticating a mobile computing device 188. In some implementations, the authentication module 204 can include a set of instructions executable by the processor 225 to provide the functionality described below for authenticating the mobile computing device 188. In some implementations, the authentication module 204 can be stored in the memory 227 of the vehicle device 200 and can be accessible and executable by the processor 225. The authentication module 204 is coupled to the bus via signal line 205.

In some implementations, the authentication module 204 receives a notification from the communication unit 245 via the communication module 202 that the communication unit 245 detects a presence of the mobile computing device 188. The authentication module 204 may determine that the user of the mobile computing device 188 intends to enter the vehicle 103. The mobile computing device 188 may provide authentication data to the vehicle device 200. For example, the authentication data may include a mobile ID that identifies the mobile computing device 188. In another example, a user provides a pin number as authentication data. The authentication module 204 authenticates that the mobile computing device 188 is authorized to receive a current vehicle condition by comparing the authentication data to the user data 291. For example, the authentication module 204 compares the mobile ID to a mobile ID that is part of the user data 291 to determine whether the identifiers match. If the mobile identifiers match, the authentication module 204 may transmit an instruction to the condition module 206 via the communication module 202 to provide a current vehicle condition to the mobile computing device 188. If the identifiers do not match, the authentication module 204 may transmit a message to the mobile computing device 188 via the communication module 202 explaining that the authentication failed.

The condition module 206 can include code and routines for receiving vehicle sensor data 293 and determining a current vehicle condition that is detrimental to operation of the vehicle. In some implementations, the condition module 206 can include a set of instructions executable by the processor 225 to provide the functionality described below for receiving vehicle sensor data 293 and determining a current vehicle condition that is detrimental to operation of the vehicle. In some implementations, the condition module 206 can be stored in the memory 227 of the vehicle device 200 and can be accessible and executable by the processor 225. The condition module 206 is coupled to the bus via signal line 207.

In some implementations, the condition module 206 receives the vehicle sensor data 293 from the sensor 247. For example, the condition module 206 receives a charge percentage for a battery. In some other implementations, the condition module 206 receives vehicle sensor data 293 from the second server 198. For example, the second server 198 may include a camera that captures images of the vehicle 103 in a parking lot and transmits the images to the vehicle 103.

The condition module 206 may determine, based on the vehicle sensor data 293 associated with the vehicle, a current vehicle condition that is detrimental to operation of the vehicle. For example, if the charge percentage for the battery decreases until the battery no longer has a charge, the vehicle 103 stops operating. In another example, the condition module 206 determines that the vehicle 103 has a malfunctioning part, such as a broken light, flat tire, or malfunctioning windshield wiper. The condition module 206 transmits, via the communication module 202, a description of the current vehicle condition to a condition message provider 101. In some implementations, the condition module 206 also transmits, via the communication module 202, the description of the current vehicle condition to the condition message provider 101.

The user interface module 208 can include code and routines for generating graphical data for providing user interfaces. In some implementations, the user interface module 208 can include a set of instructions executable by the processor 225 to provide the functionality described below for generating graphical data for providing user interfaces. In some implementations, the user interface module 208 can be stored in the memory 227 of the vehicle device 200 and can be accessible and executable by the processor 225. The user interface module 208 is coupled to the bus 220 via signal line 209.

The vehicle status application 199 may include a user interface module 208, for example, if the vehicle device 200 includes an in-dash device 200 in the vehicle 103. In some implementations, the user interface module 208 generates graphical data for displaying information about a current vehicle condition, a successful or unsuccessful authentication attempt, a detection of a presence of the mobile computing device 188, etc. The user interface module 208 may also generate graphical data for displaying a user interface for a user to provide user data 291. In some other implementations, the user interface module 208 is optional and all interactions for configuring settings for the vehicle status application 199 may be made using the journey application 190 on the mobile computing device 188.

Example Journey Application

Figure 3:
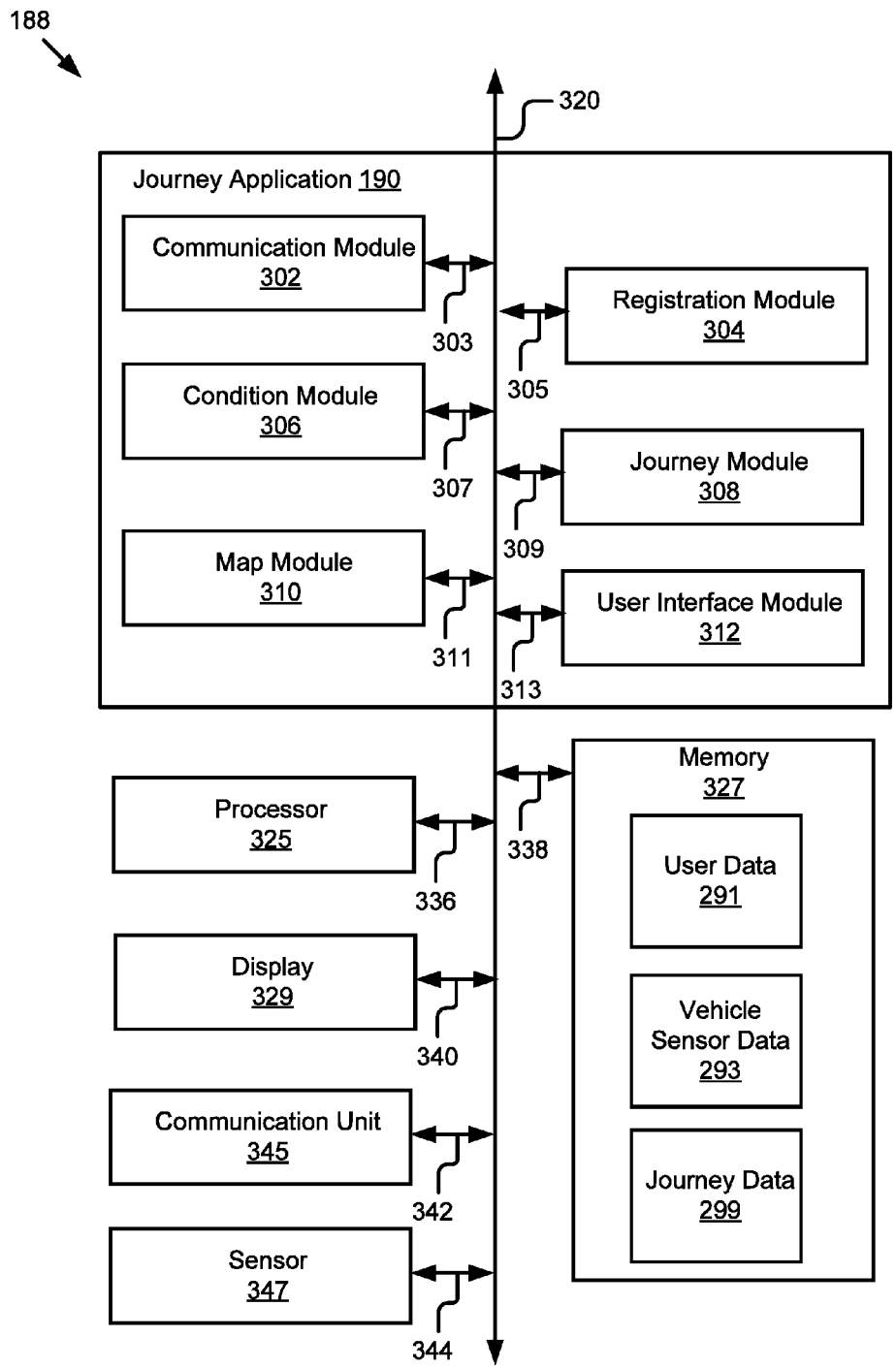
FIG. 3 is a block diagram illustrating an example mobile computing device.

FIG. 3 is a block diagram illustrating an example mobile computing device 188. The mobile computing device 188 may include a journey application 190, a processor 325, a memory 327, a display 329, a communication unit 345, and a sensor 347. In some implementations, the mobile computing device 188 may include a special-purpose computing device configured to provide some or all of the functionality described below with reference to FIG. 3. The components of the mobile computing device 188 are communicatively coupled by a bus 320.

The processor 325 is coupled to the bus 320 via signal line 336. The memory 327 is coupled to the bus 320 via signal line 338. The display 329 is coupled to the bus 320 via signal line 340. The communication unit 345 is coupled to the bus 320 via signal line 342. The sensor 347 is coupled to the bus 320 via signal line 344. The processor 325, the memory 327, and the communication unit 345 are similar to the processor 225, the memory 227, and the communication unit 245 discussed above with reference to FIG. 2 and therefore will not be discussed in detail below. In addition to the sensor 247 described above with reference to FIG. 2, the sensor 347 may include a speaker. For example, the speaker may provide audio for turn-by-turn directions generated by the journey application 190.

The memory 327 may include user data 291, vehicle sensor data 293, and journey data 299. The user data 291 and the vehicle sensor data 293 are discussed in detail above.

The journey data 299 includes information about the user's historical journeys, such as start points, destinations, durations, journeys associated with historical journeys, etc. For example, the journey data 299 could include a log of all locations visited by the vehicle 103, all locations visited by the user 125 (e.g., locations associated with both the vehicle 103 and the mobile computing device 188), and all locations requested by the user 125. The log may also include times associated with the historical journeys, for example, a time that a user travelled to various points or requested information about a location.

The display 329 can include hardware for displaying graphical data from the journey application 190. For example, the display 329 renders graphics for displaying a user interface that displays offer data, mitigating action plan data, coupons, driving directions, calendar information, and settings.

The journey application 190 includes a communication module 302, a registration module 304, a condition module 306, a journey module 308, a map module 310, and a user interface module 312.

The communication module 302 can include code and routines for handling communications between the journey application 190 and other components of the mobile computing device 188. In some implementations, the communication module 302 can include a set of instructions executable by the processor 325 to provide the functionality described below for handling communications between the journey application 190 and other components of the mobile computing device 188. In some implementations, the communication module 302 can be stored in the memory 327 of the mobile computing device 188 and can be accessible and executable by the processor 325. The communication module 302 is coupled to the bus 320 via signal line 303.

The communication module 302 sends and receives data, via the communication unit 345, to and from one or more of the mobile computing device 188, the vehicle 103, the cloud server 113, the condition message provider 101, the offer fulfillment location device 107, the second server 198, the calendar server 111, and the social network server 109. For example, the communication module 302 receives offer data and mitigating action plan data from the condition message provider 101.

In some implementations, the communication module 302 receives data from components of the mobile computing device 188 and stores the data in the memory 327. For example, the communication module 302 receives the location of the vehicle 103 as a function of time, and stores it as journey data 299 in the memory 327. In some implementations, the communication module 302 may handle communications between components of the journey application 190. For example, the communication module 302 receives user input from the user interface module 312 and transmits the user input to the registration module 304, which adds the user input to the user data 291 that is stored in the memory 327.

The registration module 304 can include code and routines for registering a user. In some implementations, the registration module 304 can include a set of instructions executable by the processor 325 to provide the functionality described below for registering the user. In some implementations, the registration module 304 can be stored in the memory 327 of the mobile computing device 188 and can be accessible and executable by the processor 325. The registration module 304 is coupled to the bus 320 via signal line 305.

The registration module 304 may receive information about a user, for example, a name, a password, etc. The registration module 304 creates a user account by assigning a user ID to the user, a mobile ID to the mobile computing device 188 associated with the user, and a vehicle ID to the vehicle 103 associated with the user. Multiple users may be associated with a single vehicle, for example, where multiple family members use the same car. The vehicle ID may include the vehicle identification number (VIN) for the vehicle 103. In some implementations, the registration module 304 transmits the user ID, the mobile ID, and the vehicle ID to the cloud server 113 to be associated with the user data 114. The registration module 304 may also transmit the user ID, the mobile ID, and the vehicle ID to the condition message provider 101 to store the data in the datastore 102.

In some implementations, the registration module 304 manages rewards for the user. For example, the registration module 304 may add points to the user account each time the user redeems a coupon or spends money at one of the offer fulfillment locations. The user may redeem the points for a reward. For example, for every $50 spent at an offer fulfillment location, the registration module 304 may reward the user with credit for $1 at the offer fulfillment location.

In some implementations, the registration module 304 receives information for linking the user's social network account(s) and calendar application with the journey application 190. For example, the registration module 304 may instruct the user interface module 312 to generate graphical data for displaying a user interface where the user can identify the social network application or the calendar application and provide a username and password for accessing the accounts.

The condition module 306 can include code and routines for transmitting a current vehicle condition to the condition message provider 101. In some implementations, the condition module 306 can include a set of instructions executable by the processor 325 to provide the functionality described below for transmitting the current vehicle condition to the condition message provider 101. In some implementations, the condition module 306 can be stored in the memory 327 of the mobile computing device 188 and can be accessible and executable by the processor 325. The condition module 306 is coupled to the bus 320 via signal line 307.

In some implementations, the condition module 306 receives vehicle sensor data 293 associated with the vehicle 103 from the vehicle 103 or the second server 198 and determines a current vehicle condition that is detrimental to the operation of the vehicle 103. In some other implementations, the condition module 306 receives the current vehicle condition from the vehicle status application 199 and transmits the current vehicle condition to the condition message provider 101.

The journey module 308 can include code and routines for determining a journey. In some implementations, the journey module 308 can include a set of instructions executable by the processor 325 to provide the functionality described below for determining the journey. In some implementations, the journey module 308 can be stored in the memory 327 of the mobile computing device 188 and can be accessible and executable by the processor 325. The journey module 308 is coupled to the bus 320 via signal line 309.

The journey module 308 determines a journey for the vehicle 103 based on historical journey data including a most frequently travelled route for a current location of the vehicle 103 at a current time. For example, the journey module 308 determines, based on the vehicle 103 being located in downtown Redwood City, Calif. at 7:30 p.m. and the user most frequently travelling from work to home, that the user is about to travel from work to home.

In some implementations, the journey module 308 receives social network data 110 from the social network server 109 and calendar data 112 from the calendar server 111 that the journey module 308 uses to determine an endpoint for the journey. For example, where the user tweets about going to a concert, the journey module 308 may determine, based on the tweet and the vehicle's 103 proximity to the concert venue, that the user is going to the concert.

In some implementations, the journey module 308 receives map data from the map module 310 or the second server 198 that the journey module 308 uses to determine an endpoint. For example, where the user requests a map from a current location to a library, the journey module 308 determines that the library is the endpoint of the journey.

The map module 310 can include code and routines for generating a map. In some implementations, the map module 310 can include a set of instructions executable by the processor 325 to provide the functionality described below for generating the map. In some implementations, the map module 310 can be stored in the memory 327 of the mobile computing device 188 and can be accessible and executable by the processor 325. The map module 310 is coupled to the bus 320 via signal line 311.

In some implementations, the map module 310 receives user input from the user interface module 312 via the communication module 302 requesting directions from a current location to an endpoint. The endpoint may include the offer fulfillment location. The map module 310 may generate the map or request map data from the second server 198.

The map module 310 may generate turn-by-turn directions. For example, the map module 310 may receive a notification from the user interface module 312 that the user accepted one or more steps of a mitigating action plan that includes an offer fulfillment location. The map module 310 may identify the offer fulfillment location from the mitigating action plan and generate turn-by-turn directions from a current location of the vehicle 103 to the offer fulfillment location.

The user interface module 312 can include code and routines for generating graphical data for providing user interfaces. In some implementations, the user interface module 312 can include a set of instructions executable by the processor 325 to provide the functionality described below for generating graphical data for providing user interfaces. In some implementations, the user interface module 312 can be stored in the memory 327 of the vehicle device 200 and can be accessible and executable by the processor 325. The user interface module 312 is coupled to the bus 320 via signal line 313.

In some implementations, the user interface module 312 generates a user interface for registering a user. For example, the user interface includes fields for the user to input a name, an email address, a password, a username, credit card information, etc. The user interface may also include sections for associating the journey application 190 with the vehicle 103. The user interface module 312 may transmit the user input to the registration module 304 via the communication module 302. In some implementations, the user interface module 312 generates a user interface that allows a user to turn on an antennae on the mobile computing device 188 so that the mobile computing device 188 may be detected by the vehicle 103.

The user interface module 312 receives instructions from the condition message provider 101 via the communication module 302 to generate graphical data for displaying mitigating action plan data and offer data on a display 329 of the mobile computing device 188. For example, where the current vehicle condition includes needing an oil change, the user interface module 312 may generate graphics for displaying information about an offer fulfillment location that can perform the oil change and an offer for a donut and coffee for a user of the vehicle 103. The offer data may include an offer with an expiration period. For example, the offer may expire ten minutes after an estimated time that it takes the vehicle 103 to travel to the offer fulfillment location. If the offer expires, the user interface module 312 may display a notice of expiration. In some implementations, the user interface module 312 receives instructions from the map module 310 to generate graphical data for displaying a map from the current location of the vehicle 103 to the offer fulfillment location.

After the user arrives with the vehicle 103 at the offer fulfillment location, the condition message provider 101 may transmit instructions to the user interface module 312 via the communication module 302 to display graphical data for displaying a coupon. For example, the user interface module 312 generates graphical data for a coupon that includes displaying a description of the offer and a barcode, a quick response (QR) code, a uniform resource locator (URL), etc. The coupon may also include an expiration time. For example, the coupon may expire 30 minutes after a user arrives at a gas station, two hours after a user arrives at the mechanic's, etc. If the coupon expires, the user interface module 312 may display a notice of expiration. The display 329 of the mobile computing device 188 displays the coupon.

The user may present the mobile device 188 at the offer fulfillment location where an offer fulfillment location device 107 may scan the barcode or the QR code to identify the terms of the offer. The offer fulfillment location device 107 may transmit the information about the offer to the advertisement selection application 104. The information about the offer may include a user ID, a mobile ID, and a vehicle ID, which the advertisement selection application 104 may use to determine how to successfully get the user (or similar users) to redeem offers in the future.

Example User Interface

Figure 4A:
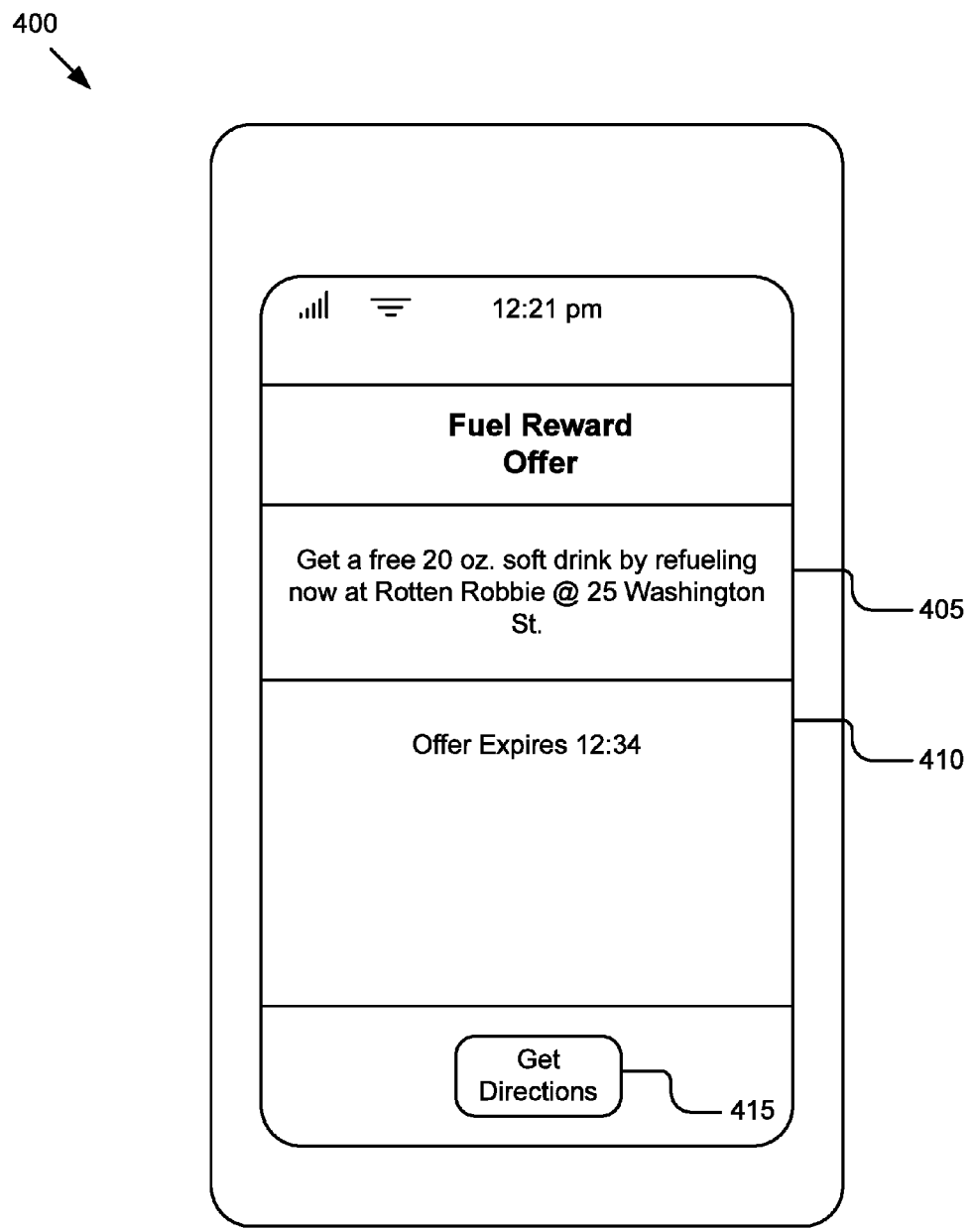
FIG. 4A is a graphic representation of an example user interface for displaying offer data that includes a fuel offer reward.

FIG. 4A is a graphic representation of an example user interface 400 for displaying mitigating action plan data and offer data that includes a fuel offer reward. In this example, the user interface module 312 generates graphical data for displaying a user interface 400 that includes mitigating action plan data and an offer 405, an expiration for the offer 410, and a "Get Directions" icon 415. The mitigating action plan data is refueling at the gas station at 25 Washington St. The offer data includes an offer of a free 20 ounce soft drink. The expiration for the offer 410 occurs 13 minutes from the time that the offer is displayed. The "Get Directions" icon 415, when selected, causes the user interface module 312 to transmit a request to the map module 310 via the communication module 302 that the map module 310 generate directions.

Figure 4B:
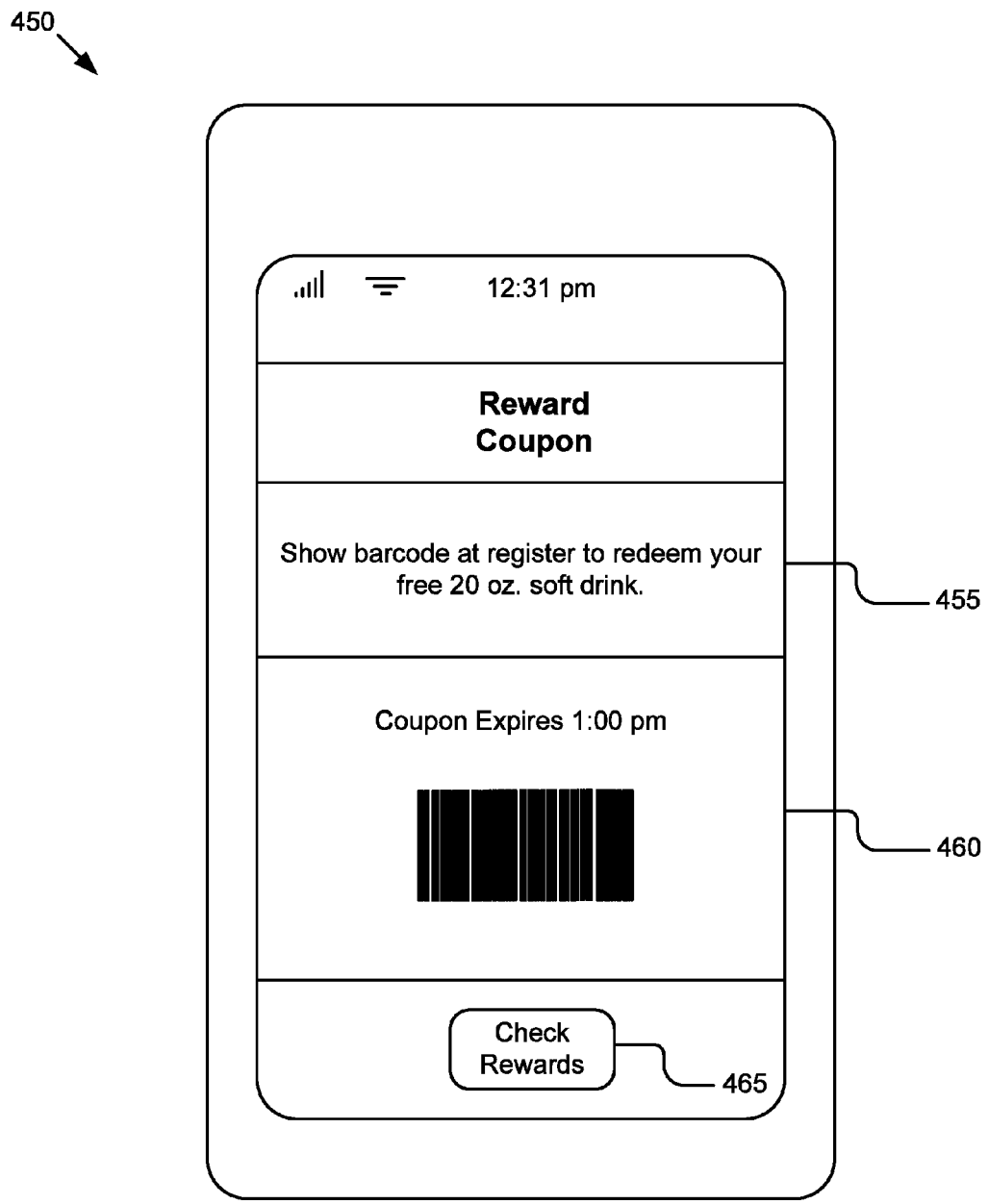
FIG. 4B is a graphic representation of an example user interface for displaying offer data that includes a coupon.

FIG. 4B is a graphic representation of an example user interface 450 for displaying offer data that includes a coupon. In this example, the user interface module 312 generates graphical data for displaying a user interface 450 that includes an offer 455, a coupon 460, and a "Check Rewards" icon 465. The offer 455 includes instructions for how to redeem the coupon. In this example, the user shows the barcode displayed on the mobile computing device 188 to redeem the offer for the free 20 ounce soft drink. The coupon 460 includes both an expiration time, which is 29 minutes from the current time, and a barcode for redeeming the offer. The "Check Rewards" icon 465, when selected, causes the user interface module 312 to transmit a request to the registration module 304 via the communication module 302 to provide instructions to the user interface module 312 to display graphical data that includes information about the user's rewards. For example, the information about the user's rewards could include how many points the user has accrued and how many rewards are available for redemption.

Example Methods

Figure 5:
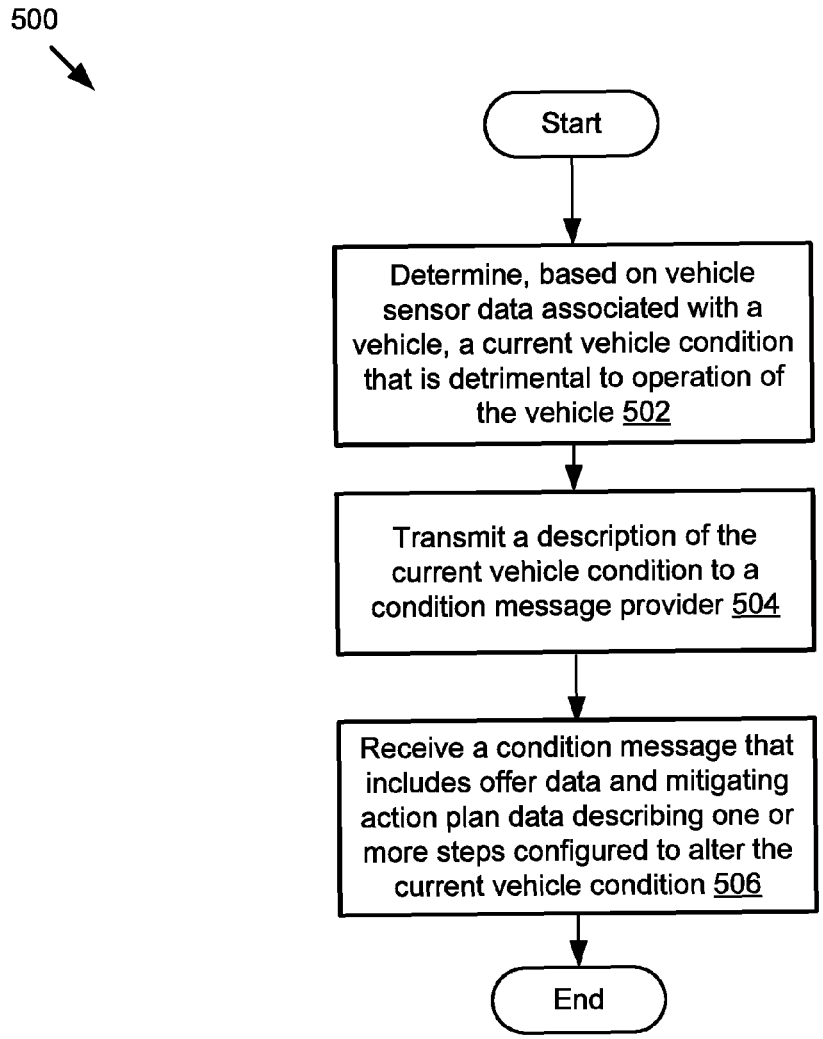
FIG. 5 is a flowchart of an example method for generating a wireless incentive by displaying mitigating action plan data and offer data.

FIG. 5 is a flowchart of an example method 500 for generating a wireless incentive by displaying mitigating action plan data and offer data. In some implementations, the method 500 may be performed by modules of the journey application 190 stored on the mobile computing device 188 in FIGS. 1 and 3 or modules of the vehicle status application 199 stored on the vehicle 103 in FIGS. 1 and 2. For example, the method 500 may be performed by a condition module 206 of the vehicle status application 199 in FIG. 1 or 2, a condition module 306 of the journey application 190, and/or a communication module 302 of the journey application 190.

In some implementations, one or more blocks of the method 500 may be performed by a processor-based computing device programmed to perform the one or more blocks of the method 500. For example, one or more steps of the method 500 may be performed by a mobile computing device programmed to perform the one or more steps of the method 500.

At block 502, a current vehicle condition that is detrimental to operation of the vehicle is determined based on vehicle sensor data. For example, the condition module 206 of the vehicle status application 199 or the condition module 306 of the journey application 190 determines, based on vehicle sensor data 293, the current vehicle condition that is detrimental to operation of the vehicle. The current vehicle condition may include, for example, a problem with the vehicle that should be analyzed by a mechanic, such as a check engine light.

At block 504, a description of the current vehicle condition may be transmitted to a condition message provider. For example, the communication module 302 of the journey application 190 may transmit the description of the current vehicle condition to the condition message provider 101. The communication module 302 may receive the current vehicle condition from the condition module 206 of the vehicle status application 199 or the condition module 306 of the journey application 190.

At block 506, a condition message is received that includes offer data and mitigating action plan data describing one or more steps configured to alter the current vehicle condition. For example, the communication module 202 may receive the condition message from the condition message provider 101. The condition message may include an offer for a 25% discount on the cost of a mechanic checking the engine and a mitigating action plan that includes travelling to the mechanic's shop.

Figure 6:
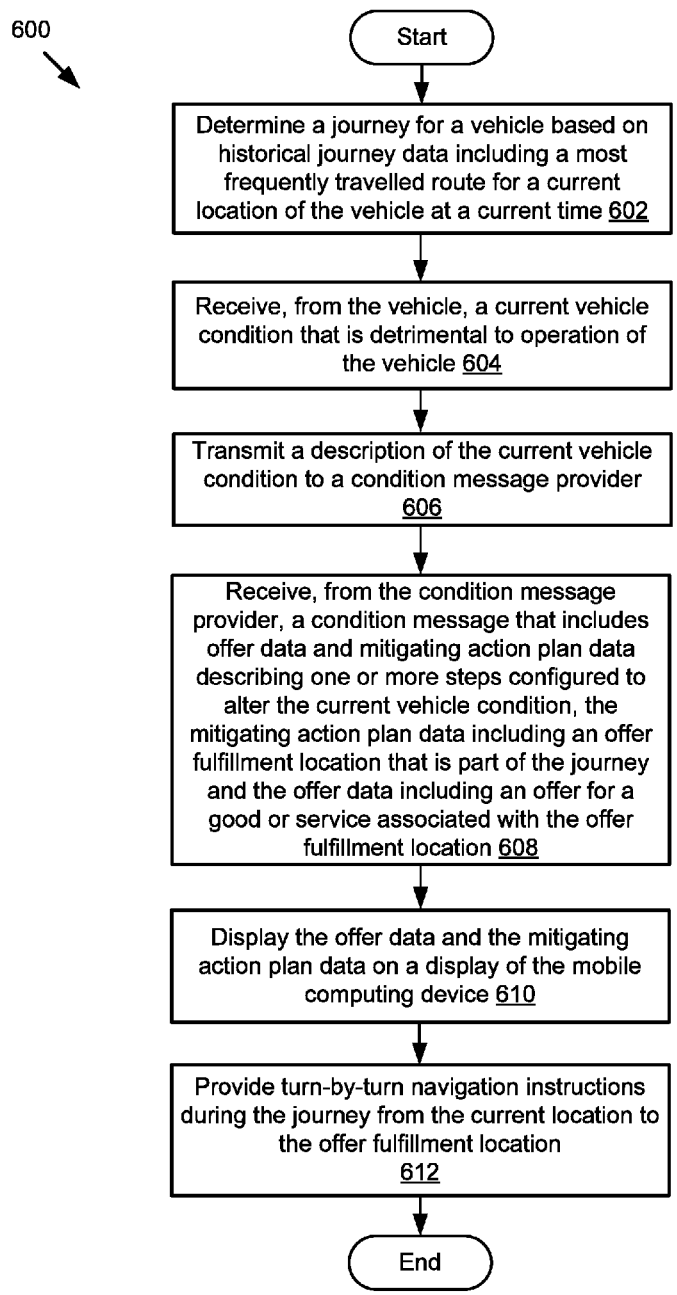
FIG. 6 is a flowchart of another example method for generating a wireless incentive.

FIG. 6 is a flowchart of another example method 600 for generating a wireless incentive. In some implementations, the method 600 may be performed by modules of the journey application 190 stored on the mobile computing device 188 of FIGS. 1 and 3. For example, the journey application 190 may include a communication module 302, a condition module 306, a journey module 308, and a map module 310.

In some implementations, one or more blocks of the method 600 may be performed by a processor-based computing device programmed to perform the one or more blocks of the method 600. For example, one or more steps of the method 600 may be performed by a mobile computing device programmed to perform the one or more steps of the method 600.

At block 602, a journey is determined for a vehicle based on historical journey data including a most frequently travelled route for a current location of the vehicle at a current time. The journey module 308 may determine the journey for the vehicle 103 based on historical journey data including the most frequently travelled route for the current location of the vehicle at the current time. For example, the journey module 308 may determine that the vehicle 103 is travelling from work to a restaurant that the user eats at every Monday at 11:30 a.m.

At block 604, a current vehicle condition that is detrimental to operation of the vehicle is received from the vehicle. The communication module 302 may receive, from the vehicle 103, the current vehicle condition. For example, the current vehicle condition may be that the battery has a charge of less than 10%.

At block 606, a description of the current vehicle condition is transmitted to a condition message provider. For example, the communication module 302 transmits the description of the current vehicle condition to the condition message provider 101.

At block 608, a condition message that includes offer data and mitigating action plan data describing one or more steps configured to alter the current vehicle condition is received from the condition message provider, where the mitigating action plan data includes an offer fulfillment location that is part of the journey and the offer data includes an offer for a good or service associated with the offer fulfillment location. For example, the communication module 302 receives, from the condition message provider 101, the condition message. The offer may be for a free candy bar at a charging station that is on the way from the user's work to the restaurant.

At block 610, the offer data and the mitigating action plan data are displayed on a display of the mobile computing device. The display 329 of the mobile computing device 188 may display the offer data and the mitigating action plan data. For example, the display 329 includes text offering the free candy bar and the mitigating action plan data includes identification of the charging station where the user can redeem the offer for the free candy bar.

At block 612, turn-by-turn navigation instructions are provided during the journey from the current location to the offer fulfillment location. The map module 310 may generate and the communication module 302 may provide the turn-by-turn navigation instructions during the journey from the current location to the offer fulfillment location. In some implementations, the map module 310 may generate the turn-by-turn navigation instructions in response to receiving user input confirming that the user would like directions to the offer fulfillment location.

The descriptions of the specification can also relate to an apparatus for performing the operations herein. This apparatus may include the user of a special-purpose or general-purpose computer including various computer hardware or software modules. Implementations described herein may be implemented using a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The processors described herein may be programmed to perform one or more blocks of the methods 500, 600. The processor programmed to perform one or more blocks of the methods 500, 600 may be a special-purpose computing device.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A method comprising:
   determining, based on vehicle sensor data associated with a vehicle, a current vehicle condition associated with the vehicle that is detrimental to operation of the vehicle; and
   receiving a condition message that includes offer data and mitigating action plan data describing one or more steps configured to alter the current vehicle condition, the mitigating action plan data including an offer fulfillment location included in a route of a journey for the vehicle and the offer data including an offer for a good or service associated with the offer fulfillment location.

2. The method of claim 1, wherein the offer data includes a wait time at the offer fulfillment location.

3. The method of claim 1, further comprising:
   determining turn-by-turn navigation instructions based on the mitigating action plan data and user input indicating that a user accepts the one or more steps of the mitigating action plan data; and
   providing the turn-by-turn navigation instructions during the journey from a current location to the offer fulfillment location, wherein the journey includes a start point and end point determined prior to receipt of the mitigating action plan and the mitigating action plan is configured so that (1) the offer fulfillment location is between the start point and the end point and (2) the offer is more likely to be accepted because the journey does not have to be changed.

4. The method of claim 1, further comprising determining the journey for the vehicle based on a most frequently travelled route for a current location at a current time.

5. The method of claim 4, further comprising:
   displaying the mitigating action plan data and the offer data on a display of a mobile computing device associated with a user of the vehicle and the mobile computing device;
   responsive to the vehicle arriving at the offer fulfillment location, receiving graphical data that displays a barcode; and
   displaying the barcode on the display of the mobile computing device.

6. The method of claim 1, further comprising:
   detecting a presence of the vehicle that is paired with a mobile computing device; and
   receiving the vehicle sensor data from the vehicle; and
   wherein determining the current vehicle condition is performed by the mobile computing device.

7. The method of claim 6, further comprising, responsive to detecting the presence of the vehicle that is paired with the mobile computing device, determining that the journey begins.

8. The method of claim 1, wherein:
   the vehicle detects a presence of a mobile computing device that is paired with the vehicle; and
   determining the current vehicle condition is performed by the vehicle.

9. The method of claim 8, further comprising providing authentication data to the vehicle to authenticate that the mobile computing device is authorized to receive the current vehicle condition from the vehicle.

10. The method of claim 9, wherein the vehicle detects the presence of the mobile computing device using direct point-to-point wireless communication between the vehicle and the mobile computing device associated with a user.

11. The method of claim 1, further comprising sending fulfillment transaction data to a condition message provider.

12. The method of claim 1, further comprising registering a user, including importing information from at least one of a social network account associated with the user and an online calendar account associated with the user.

13. The method of claim 12, wherein determining the journey for the vehicle is further the at least one of the social network account associated with the user and the online calendar account associated with the user.

14. The method of claim 1, wherein the offer data includes an expiration time that is calculated based on an estimated time of arrival at the offer fulfillment location.

15. A non-transitory computer-readable medium having computer instructions stored thereon that are executable by a processing device to perform or control performance of operations comprising:
   determining, based on vehicle sensor data associated with a vehicle, a current vehicle condition that is detrimental to operation of the vehicle; and
   receiving a condition message that includes offer data and mitigating action plan data describing one or more steps configured to alter the current vehicle condition, the mitigating action plan data including an offer fulfillment location included in a route of a journey for the vehicle and the offer data including an offer for a good or service associated with the offer fulfillment location.

16. The non-transitory computer-readable medium of claim 15, wherein the offer data includes a wait time at the offer fulfillment location.

17. The non-transitory computer-readable medium of claim 15, the operations further comprising:
   determining turn-by-turn navigation instructions based on the mitigating action plan data and user input indicating that the user accepts the one or more steps of the mitigating action plan data; and
   providing the turn-by-turn navigation instructions during the journey from a current location to the offer fulfillment location.

18. The non-transitory computer-readable medium of claim 15, the operations further comprising determining the journey for the vehicle based on historical journey data describing a most frequently travelled route for a current location of the vehicle at a current time.

19. The non-transitory computer-readable medium of claim 15, the operations further comprising:
   displaying the mitigating action plan data and the offer data on a display of a mobile computing device;
   responsive to the vehicle arriving at the offer fulfillment location, receiving graphical data that displays a barcode; and
   displaying the barcode on the display of the mobile computing device.

20. A system comprising:
   a vehicle comprising a vehicle status application stored on an onboard computer of the vehicle, the vehicle status application including instructions that, when executed by the onboard computer, cause the onboard computer to:
      determine, based on vehicle sensor data associated with the vehicle, a current vehicle condition associated with the vehicle that is detrimental to operation of the vehicle; and
      receive a condition message that includes offer data and mitigating action plan data describing one or more steps configured to alter the current vehicle condition, the mitigating action plan data including an offer fulfillment location included in a route of a journey for the vehicle and the offer data including an offer for a good or service associated with the offer fulfillment location.

* * * * *